United States Patent [19]

Phillips

[11] 4,046,019

[45] Sept. 6, 1977

[54] LOCKING DEVICE FOR A LIFT

[76] Inventor: Arthur V. Phillips, 1289 Easley Drive, Westland, Mich. 48185

[21] Appl. No.: 587,269

[22] Filed: June 16, 1975

[51] Int. Cl.² ...... F16H 19/04

[52] U.S. Cl. ...... 74/29; 74/422

[58] Field of Search ...... 74/29, 411.5, 422

[56] References Cited

U.S. PATENT DOCUMENTS

| | | | |
|---|---|---|---|
| 1,218,021 | 3/1917 | Walther | 74/422 |
| 2,502,057 | 3/1950 | Mitchell | 74/29 |
| 3,762,235 | 10/1973 | Splinter | 74/411.5 |

FOREIGN PATENT DOCUMENTS

| | | | |
|---|---|---|---|
| 1,076 | 1871 | United Kingdom | 74/29 |

*Primary Examiner*—Samuel Scott
*Assistant Examiner*—Wesley S. Ratliff, Jr.
*Attorney, Agent, or Firm*—Gifford, Chandler, Sheridan & Sprinkle

[57] ABSTRACT

A locking device for a lift having a base and a lifting platform which may be variably elevated above the base of the lift. The locking device comprises an elongated gear rack secured at one end to the lifting platform of the lift and slidably received within a housing secured to the base of the lift. A first gear, having its axle secured to the housing, is positioned within the housing so that the first gear continually meshes with the gear rack. A second gear is also disposed in the housing and is movable between a first and a second position. In the first position the second gear meshes only with the gear rack thus permitting longitudinal movement of the gear rack whereas in the second position the second gear meshes with both the gear rack and the first gear thus forming a three point gearing system and preventing further longitudinal movement of the gear rack.

5 Claims, 4 Drawing Figures

LOCKING DEVICE FOR A LIFT

BACKGROUND OF THE INVENTION

I. Field of the Invention

The present invention relates generally to safety devices and more particularly to a safety device for locking the elevational height of a lift and preventing unintended collapse of the lift.

II. Description of the Prior Art

Previously known lifts, such as hydraulic lifts commonly used in service stations, have not been provided with safety devices for locking the lift in a fixed elevational position. Consequently, upon failure of the lift, or its power mechanism, the lift would oftentimes collapse to the ground. Collapse of the lift not only causes severe damage to a vehicle positioned on the lift platform but also creates a great safety hazard in that persons standing under the lift would be seriously injured by the collapse of the lift.

In order to reduce the safety hazard of possible collapse of the lift, several previously known locking devices have been developed to prevent the unintended collapse of the lift. These previously known locking mechanism, however, suffer several disadvantages unknown to the present invention.

In one type of the previously known locking mechanisms for lifts, the locking mechanism only functions to lock the lift when the lift is in its most elevated position. Thus if the lift is lowered somewhat, for example, to permit easier access to the bottom of the vehicle on the lift, the locking mechanism is non-functional thereby resurrecting the original safety hazard.

Other previously known locking mechanisms for lifts are only capable of locking the lift in predetermined increments of elevational height rather than at any desired height. A locking device capable of locking the lift at any desired height provides increased flexibility and therefore is preferred.

Other previously known locking mechanisms for lifts are unduly complex and expensive to not only manufacture and install but also to operate. Such previously known locking devices in addition require extensive maintenance which accordingly increases the cost of the locking mechanism.

SUMMARY OF THE PRESENT INVENTION

The locking device of the present invention overcomes the above mentioned disadvantages of the previously known locking mechanism for lifts by providing a locking device operable to lock the lift at any desired elevational height and which moreover is simple and inexpensive in construction. The locking device of the present invention provides the additional advantage that it is virtually maintenance free.

The present invention achieves the abovementioned advantages by providing an elongated rack which is secured to the platform of the lift and is slidably received in a housing secured to the base of the lift. A first gear wheel is rotatably secured to the housing and positioned so that the first gear wheel meshes with the gear rack. A second gear wheel also meshes with the gear rack in the housing and is movable between a first and a second position. In the first position the second gear wheel meshes only with the rack so that the lift platform with the attached gear rack may be freely raised and lowered. By shifting the second gear wheel to its second position, the second gear wheel meshes both with the rack and the first gear wheel thus creating a three point gear arrangement and locking the gear rack, and hence the lift platform against further movement. By returning the second gear wheel to its first position, the gear rack, and hence the lift platform are again free to be raised or lowered

BRIEF DESCRIPTION OF THE DRAWINGS

Other advantages of the locking device of the present invention will become apparent by reference to the following detailed description when read in conjunction with the accompanying drawing wherein like reference characters refer to like parts throughout the several views and in which.

DETAILED DESCRIPTION OF THE PRESENT INVENTION

Figure 1:
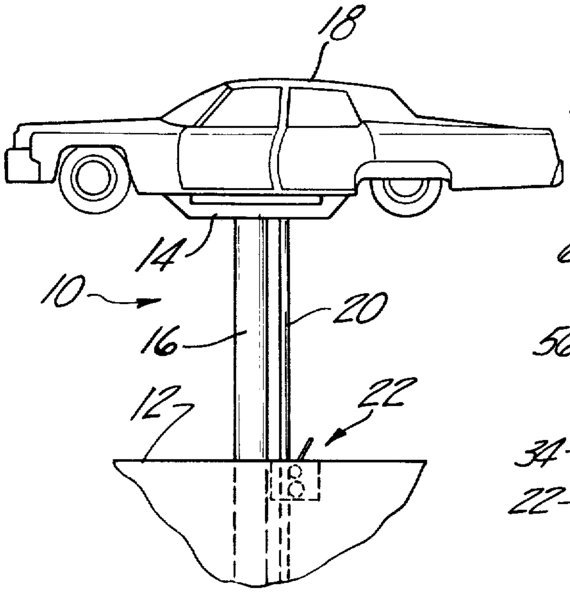
FIG. 1 is a side view showing the locking device of the present invention installed on a lift.

Referring particularly to FIG. 1, a lift 10 is shown having a base 12, a lifting platform 14 and a lifting piston 16. Any vehicle 18 or the like, such as a car, may be elevated on top of the platform 14 as shown in FIG. 1. Typically a guide tube 20 is secured to the platform 14 and slidably received in a cylinder (not shown) in the base 12 to prevent rotation of the platform 14 as the platform 14 is raised. The locking device 22 of the present invention is preferably recessed into the base 12 adjacent the guide tube 20.

Figure 2:
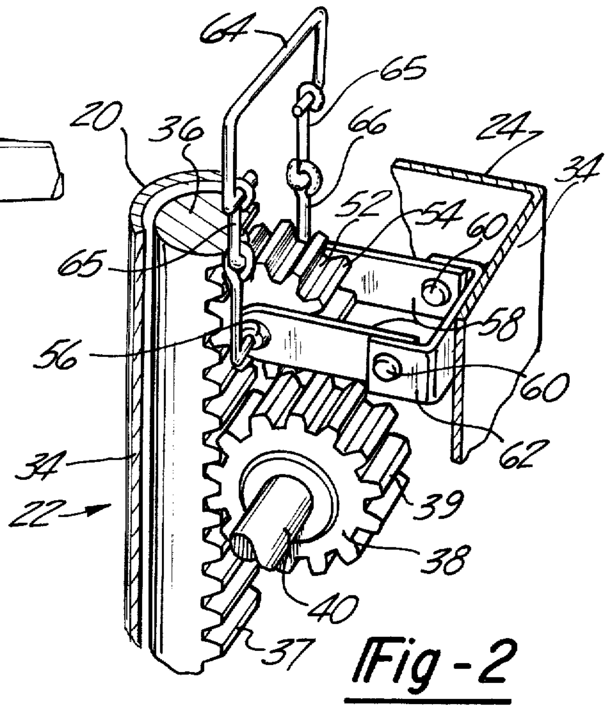
FIG. 2 is a perspective view of the locking device of the present invention, enlarged and with parts removed for clarity.
Figure 3:
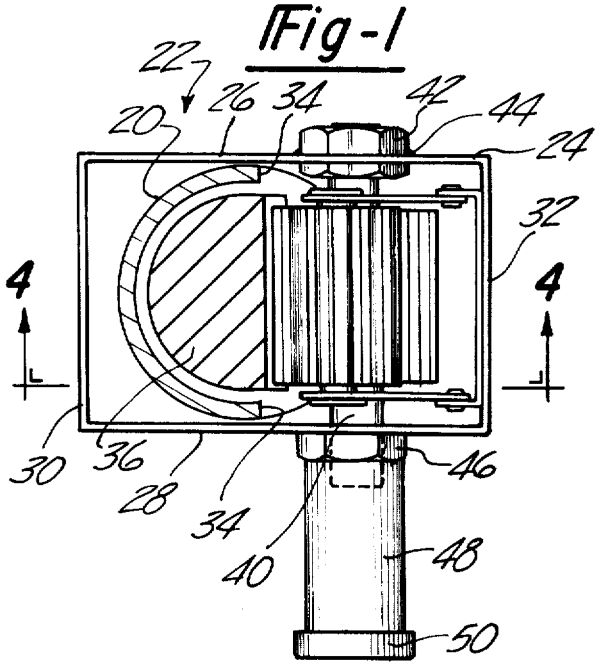
FIG. 3 is a top partial cross sectional view of the locking device of the present invention and enlarged for clarity.
Figure 4:
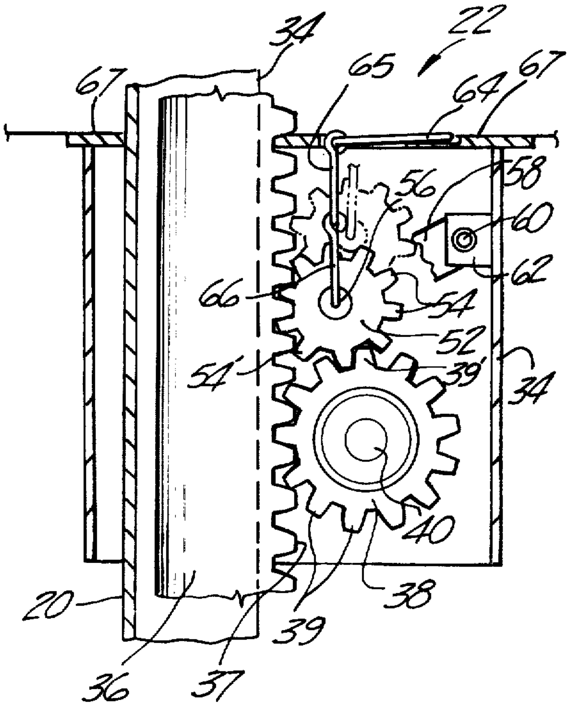
FIG. 4 is a cross sectional view taken substantially along line 4—4 in FIG. 3.

Referring now to FIGS. 2–4 where the locking device 22 of the present invention is enlarged for greater detail, the locking device 22 is primarily contained within a housing 24. The housing 24 preferably comprises a vertical rectangular channel having sidewalls 26 and 28 and end walls 30 and 32. The guide tube 20 is slidably received within the housing 24 and, as previously noted, the upper edge of the housing 24 is preferably flush with the base 12 of the lift 10.

In the preferred form of the invention a longitudinal section of the guide tube 20 is removed thus leaving a pair of spaced and parallel vertical edges 34 along the guide tube 20. An elongated gear rack 36 is placed within the guide tube 20 through the rectangular opening formed by the edges 34 of the guide tube 20 so that the gear rack 36 is generally vertically disposed between the lift platform 14 and the lift base 12. The gear rack 36 preferably extends along the entire length of the guide tube 20 so that the upper edge of the gear rack 36 is adjacent the lift platform 14. The upper end of the gear rack 36, in addition, is secured either directly to the lift platform 14 or indirectly to the lift platform 14 by securing the gear rack 36 to the guide tube 20 so that as the lift 10 is elevated, the gear rack 36 moves vertically in correspondence with the lift platform.

It should be understood, however, that it is not necessary to the present invention that the elongated rack 36 be located in the guide tube 20. For example, the gear rack 36 may alternatively be secured to the exterior of either the guide tube 20 or the lifting cylinder 16. In yet still another form the elongated rack 36 may be vertically disposed with its upper end secured to the platform 14 and its lower end slidably received within the housing 24 at a position spaced from both the guide tube 20 and the cylinder 16.

A gear wheel 38 with gear teeth 39, is rotatably mounted on an axle 40 which is secured intermediate side walls 26 and 28 of the housing 24 so that the teeth 39 of the gear wheel 38 mesh with the teeth 37 of the gear rack 36. The axle 40 may be secured to the housing 24 by any conventional means, such as a nut 42 fastened to the sidewall 26 of the housing 24 by welds 44 and a second removable nut 46 securing the axle 40 to the sidewall 28 of the housing 24. The second nut 46 is preferably removable to permit removal of the gear wheel 38, if required, and for this purpose a cylindrical access tube 48 is provided around the nut 46. A dirt cap 50 preferably covers the open end of the access tube 48 to prevent foreign debris from the accumulating around the nut 46 or axle 40.

Referring primarily to FIGS. 2 and 4, a second locking gear 52 having teeth 54 adapted to mesh with the teeth 37 on the gear rack 36 is positioned within the housing 24 vertically above the gear wheel 38. The locking gear wheel 52 is rotatably mounted on an axle 56 by any appropriate bearing means and the axle 56 in turn is secured to one end of a pair of elongated, spaced and parallel arm members 58. The other end of the support arms 58 are fastened by pivot pins 60 to a U-shaped bracket 62 secured by any conventional means, such as welding, to the end wall 32 of the housing 24.

Referring now particularly to FIG. 4, it can be seen that by pivoting the support arm 58 around the pivot pin 60 the locking gear wheel 52 is movable between a first position, illustrated in phantom lines, and a second position illustrated in solid lines. In the first position the gear wheel 52 is spaced apart from the gear wheel 38 but still meshes with the gear rack 36. Thus with the gear wheel 52 in the first position, the rack 36 is free to move longitudinally without interference from the gear wheels 52 and 38. Conversely, with the gear wheel 52 in the second position, the gear wheel 52 meshes with both the gear wheel 38 and the gear rack 36 thereby forming a three point gearing arrangement in which neither gear wheel 38 or 52 may rotate thereby preventing longitudinal movement of the gear rack 36 as will later be more fully described.

In order to move the locking gear 52 between the first and second position, a handle 64 is attached by links 65 and 66 to the support arm 58, thus providing a means to manually position the gear wheel 52. It is to be understood, however, that other means may be used to position the gear wheel 52. For example, pneumatic or electro-mechanical positioning means or the like may be used to move the gear wheel 52 between its first and second position without deviating from the spirit of the invention.

Assuming that it is desired to raise the lift, the operation of the present invention is as follows:

The gear wheel 52 is manually moved by the handle 64 to its first position so that the gear wheel 52 is spaced apart from the gear wheel 38. The links 65 preferably rest on the lid 67 of the housing 24 to retain the gear wheel 52 in its first position as shown in phantom lines in FIG. 4. As the lift 10 rises, the gear rack 36 likewise rises thus rotating gear wheels 52 and 38 in a clockwise direction as viewed in FIG. 4. When the desired elevation for the hydraulic lift 10 is obtained, the gear wheel 52 is lowered to its second position so that the gear wheel 52 meshes with both the gear rack 36 and the gear wheel 38. Thereafter assuming a failure of the lift 10, the weight of the vehicle 18 creates a downward vertical force on the gear rack 36 thus urging both gear wheels 38 and 52 to rotate in a counterclockwise direction. However, since gear wheel 52 meshes with gear wheel 38 an interference is created between the tooth 54' of gear wheel 52 and the tooth 39' of the gear wheel 38 thus locking both gear wheels 52 and 38 against rotation and consequently preventing downward movement of both the gear rack 36 and the lift platform 14. The gear rack 36 thus supports the lift platform 14 and vehicle 18 until the appropriate repairs are completed on the lift 10.

It can thus be seen that the locking device of the present invention is not only simple and inexpensive in construction but also permits the hydraulic lift to be locked at any desired vertical elevation. Moreover the locking device 22 of the present invention is rugged in construction and virtually maintenance free.

Many modifications and alterations to the present invention will become apparent to those skilled in the art to which the present invention pertains without deviating from the spirit of the invention as defined by the scope of the appended claims.

What is claimed is:

1. A locking device for a lift, said lift having a base and a platform wherein said lift may be variably elevated relative to said base, said locking device comprising,

- an elongated gear rack secured to said platform and axially and slidably received in a housing, said housing secured to said base;
- a first rotatable gear having its axle secured with respect to said base and being positioned to mesh with said gear rack;
- a second gear disposed in said housing and adapted to mesh with said rack, means for mounting said second gear axially along said gear rack between a first and second position so that in said first position said second gear is spaced apart from said first gear whereas in said second position, said second gear meshes with both the gear rack and the first gear thereby locking said gear rack against further longitudinal movement.

2. The invention as defined in claim 1 wherein said means for moving said second gear between said first and second position comprises a pair of spaced and parallel elongated support arms secured at one end to said second gear and pivotably mounted at their other end to a bracket, said bracket secured to said housing, and a handle connected to said support arms.

3. The invention as defined in claim 1 wherein said lift includes a guide tube secured to said platform and wherein said gear rack is secured to the interior of said guide tube.

4. The invention as defined in claim 1 wherein said housing is recessed into said base.

5. A locking device for a lift, said lift having a base and a platform wherein said lift may be variably elevated relative to said base, said locking device comprising,

- a housing secured to said base,
- an elongated gear rack secured to said platform and axially and slidably received in and through said housing, a first rotatable gear having its axle rotatably journaled in said housing and positioned to mesh with said gear rack;

a pair of spaced and parallel elongated support arms pivotably mounted at one end to said housing and having a second gear rotatably mounted between the other end of said support arms, said second gear being positioned to mesh with said gear rack, and a handle secured to said support arms for moving said second gear axially along said gear rack between a first and second position so that in said first position said second gear is spaced apart from said first gear whereas in said second position, said second gear meshes with both the gear rack and the first gear thereby locking said gear rack against further longitudinal movement.

* * * * *